(12) United States Patent
Boyden et al.

(10) Patent No.: US 6,301,367 B1
(45) Date of Patent: *Oct. 9, 2001

(54) WEARABLE AUDIO SYSTEM WITH ACOUSTIC MODULES

(75) Inventors: James H. Boyden, Los Altos Hills; Wayne Burdick, Belmont Avenue; Lorna Ross-Brook, Los Angeles; Tricia L. Wright, San Francisco; Daniell Hebert, San Francisco; Simon Gatrall, San Francisco, all of CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/096,114

(22) Filed: Jun. 11, 1998

Related U.S. Application Data (63) Continuation-in-part of application No. 08/877,793, filed on Jun. 18, 1997, now Pat. No. 5,888,280, which is a continuation of application No. 08/417,310, filed on Apr. 5, 1995, now Pat. No. 5,680,465, which is a division of application No. 08/400,901, filed on Mar. 8, 1995, now Pat. No. 5,617,477.

(51) Int. Cl.$^7$ .................................................. H04R 25/00
(52) U.S. Cl. .............................. 381/376; 2/209; 379/430; 381/370; 381/371; 381/374
(58) Field of Search .................................. 379/430; 2/209; 381/370, 371, 372, 373, 374, 376, 381, 382, 383, 379, FOR 149, FOR 150

(56) References Cited

U.S. PATENT DOCUMENTS

| | | |
|---|---|---|
| 3,894,196 | 7/1975 | Briskey . |
| 4,070,553 | 1/1978 | Hass . |
| 4,110,583 * | 8/1978 | Lepper ............................. 179/156 R |
| 4,490,842 | 12/1984 | Watanabe . |
| 5,022,486 | 6/1991 | Miura et al. . |
| 5,138,663 | 8/1992 | Moseley . |
| 5,459,290 * | 10/1995 | Yamagishi ............................. 181/129 |
| 5,617,477 * | 4/1997 | Boyden ............................... 381/183 |
| 5,680,465 * | 10/1997 | Boyden ............................... 381/183 |
| 5,781,638 * | 7/1998 | Hosaka et al. ........................ 381/183 |
| 5,806,146 * | 9/1998 | Chen ...................................... 24/3.11 |

* cited by examiner

Primary Examiner—Curtis A. Kuntz
Assistant Examiner—Dionne Harvey
(74) Attorney, Agent, or Firm—Sierra Patent Group, Ltd.

(57) ABSTRACT

Acoustic modules adapted to be worn on the head of a wearer, such as with a headband, or fastened to a hat or eyeglasses, are provided. The modules are situated on opposite sides of the wearer's head, adjacent the ears, and each contains a transducer, an outlet port and a vent port. The audio system is connected to, or in communication with, a conventional source of audio signals, such as a radio, tape player, CD player, cellular telephone, or the like.

44 Claims, 6 Drawing Sheets

WEARABLE AUDIO SYSTEM WITH ACOUSTIC MODULES

CROSS-REFERENCE TO RELATED APPLICATIONS

This application is a continuation-in-part of U.S. patent application Ser. No. 08/877,793, filed Jun. 18, 1997 now U.S. Pat. No. 5,888,280 and entitled "Headband With Audio Speakers," which in turn is a continuation of U.S. patent application Ser. No. 08/417,310, filed Apr. 5, 1995, now U.S. Pat. No. 5,680,465, which in turn is a division of U.S. patent application Ser. No. 08/400,901, filed Mar. 8, 1995, now U.S. Pat. No. 5,617,477.

TECHNICAL FIELD

The present invention relates to portable entertainment and personal communication and information systems, particularly wearable audio systems.

BACKGROUND OF THE INVENTION

There are many situations where it is desirable to provide audio output for personal use to be worn or carried near the body. This audio output could be used for portable entertainment, personal communications, information and the like. These personal and portable communication and entertainment products include, for example, cellular and portable radios, tape players, CD players and audio portions of portable video systems and personal monitors.

The audio output for many of these systems is typically directed to the wearer through the use of transducers physically positioned in the ear or covering the ear, such as earphones and headphones. Earphones and headphones, however, are often uncomfortable to use for long periods of time. Also, they can block or attenuate environmental sounds causing the wearer to lose contact with the surroundings. This can compromise safety considerations if the wearer is engaging in activities such as jogging, driving a vehicle, or operating machinery. Further, the feeling of being partially disconnected from one's audio environment often adds to the discomfort of conventional headphones and earphones.

One common use of audio systems with earphones and headphones involves exercise and athletic events. It is quite common to see people jogging or exercising with headphones or earphones positioned in or covering their ears. Not only is this dangerous since the person often loses contact with external sounds and surroundings, but the earphones and headphones are subject to being dislodged as a result of the activity.

It is commonly desired to provide stereo audio output from these portable entertainment and personal communication systems. Also, a stereo audio output may be provided without earphones or headphones by arranging small loud speakers (a/k/a transducers) on the body. These small speakers, however, are not able to create broad-band high fidelity sound, particularly in the low frequency ranges, and furthermore will radiate a substantial amount of sound into the wearer's surroundings, which can be unacceptably annoying to others in the vicinity. In this regard, loud speaker transducers are usually mounted in enclosures to confine the acoustic radiation from the rear portions of the transducer so that the radiation does not combine with out-of-phase radiation from the front portions of the transducer. Without such an enclosure, there is a significant reduction of net radiated intensity, especially in the low frequency audio ranges.

For wearable speakers, the requirement of an enclosure creates a problem. In general, the volume of the enclosure will be quite small and its acoustic stiffness will dominate the speaker behavior. The result will be a high resonance frequency and consequently a poor low frequency response.

SUMMARY OF THE INVENTION

It is an object of the present invention to provide an improved audio system for portable entertainment and personal communication systems. It is another objective of the present invention to provide a portable audio system which provides high quality sound, particularly at low audio frequencies.

It is another objective of the present invention to provide a non-occluding wearable audio system which can be easily worn and does not interfere with the person's activity, whether sports related or otherwise. It is a still further objective of the present invention to provide a wearable audio system which does not require the speakers to be contacting, positioned in, or covering the wearer's ears and thus overcome a number of the problems and drawbacks with present systems.

The present invention fulfills these objects and overcomes the problems with known systems by providing a personal audio system which provides high quality sound and a wearable configuration which does not interfere with the person's activity and does not block environmental sounds. In accordance with the present invention, portable acoustic modules are provided which are wearable on the person's head and provide sounds to the ears without the necessity of actually being positioned in, touching, or covering the ears.

The present invention utilizes one or more speakers positioned on opposite sides of the wearer's head, each emitting sounds which can be heard primarily by the adjacent ears. The invention uses the unique combination of the radiation characteristics of dipole (doublet) sources with certain placement of the transducers on the head.

The speakers are contained in acoustic modules positioned adjacent each of the wearer's ears. The modules also each have an acoustic outlet port and an acoustic vent port. Each outlet port is located in close proximity to the wearer's ears, especially the entrance to the ear canal, while the vent port is located a substantial distance away from the ear canal. One or more transducers (a/k/a speakers) are mounted in each module, and positioned between the two ports. The transducers are sealed into a wall or structural member forming a pair of chambers (ducts) in the modules which are vented as described. The ducts add acoustic mass, which lowers the resonant frequencies of the system, extending the bass response.

Since the outlet port and vent port are positioned on each module at substantially different distances from the ear and ear canal of the wearer when the module is worn, this minimizes the cancellation of sound from the two sources which are nominally 180° out of phase at low frequencies. The ratio of the distance of the vent port from the ear canal of the wearer to the distance of the outlet port from the ear canal is at least 2:1, and preferably 3:1, 4:1, or higher.

The acoustic modules or enclosures can be hollow or filled with an acoustically transparent material, such as an open cell foam. They can also be filled or partially filled with an acoustic damping material, for example Dacron fibers. Preferably, the acoustic modules are part of a headset and attached to a headband or headbands which are worn on the wearer's head. The modules also could be integrated into or clipped onto one of the various types of head gear worn today, such as caps, helmets, headbands, hats, and the like. The modules could also be adapted to be clipped on, or attached to, the wearer's glasses or sunglasses, or an active personal display device. It is also possible to combine the headset with a microphone for two-way communication. The wearer could choose the desired mode of use and apparel based on a number of factors, such as the needs of fashion, or the type of activity involved. As evident, the invention has a wide variety of business, social, and personal uses.

The audio signal could be generated by any of the conventional music or communication systems known today, such as a radio, CD player, cellular telephone, portable telephone, cassette tape, solid-state audio player, computer (desktop or portable), personal information device, or the like. The audio signal could be transmitted to the wearable device by either a wired or wireless system. The modules themselves, or the headband, cap, hat, etc., could contain the necessary electronic module, batteries, antenna (s), and other electronic components, or they could be contained in a stationary or portable structure, such as a Walkman-type device.

For a clip-on audio system, a single acoustic device or two acoustic devices (left and right) can be provided which are adapted to be attached to a conventional hat, cap, helmet, or other headgear. With such a system, the openings (outlet ports) in the devices which provide the primary audio component of the system to the wearer are adapted to be positioned adjacent to, or in close proximity to, the wearer's ears. Also, regardless of whether the audio system is self-contained or a clip-on device, preferably the orientation and positioning of the acoustic modules are adjustable. In this manner, the system can be adjusted to fit all wearers and to provide the best audio output to the wearer's ears.

The acoustic modules and headband can be made of any conventional material, such as a plastic material. A metal support could be included in the headband, if desired. The clip-on system could be attached with conventional fasteners, elastic bands, or the like. The modules and headband could be made of a hard material or could have a semi-soft structure which could be formed or molded to fit more comfortably on the wearer's head.

As indicated, the modules need not touch or cover the ears at all. However, in some applications and designs it may be desirable to add some contact support such as small, soft pads which are arranged to hold the modules away from ear contact and to minimize head contact while maximizing comfort. The pad material may be of the relaxing foam type that gradually reshapes itself to conform to its contact surface, thus uniformly distributing the force over the contact area.

These and other objects, features, benefits and advantages of the present invention will become apparent from the following description of the invention when viewed in accordance with the following description, attached drawings, and appended claims.

DESCRIPTION OF THE DRAWINGS

FIGS. 20–22 depict an alternate embodiment of the invention in which the acoustic modules are fastened to a pair of eyeglasses, with FIG. 21 being a perspective view of one of the modules, and FIG. 22 is a cross-sectional view taken along line 22—22 in FIG. 20.

BEST MODE(S) FOR CARRYING OUT THE INVENTION

For portable entertainment, personal communication and information systems, it is desirable to utilize frequencies as low as 80 Hz (or lower) in order to achieve what is perceived to be high fidelity performance. This is comparable to what is commonly available from inexpensive earphones and small loudspeakers. Systems with small speakers of conventional design whose size is suitable for wearing are unsatisfactory for this purpose. Also, compensating techniques such as vented "bass reflex" enclosures cannot be used for this purpose. In small enclosures, the stiffness of the air in the sealed enclosure will dominate the behavior of the system.

It is known that loud speaker transducers should be mounted in enclosures to confine the acoustic radiation from the rear portions or surface of the transducer so that it does not combine with the out-of-phase radiation from the front portions of the surface. If the two radiations combine, a large reduction of net radiated intensity results, especially at low frequencies.

The combination of transducer and enclosure behaves like a high pass filter whose turnover frequency depends on several system parameters. These parameters include the free-space resonant frequency of the transducer, and the volume "V" of the sealed enclosure which acts to produce a restoring force for the diaphragm of the transducer. For small enclosures, such as those which might be worn on the body, the enclosure stiffness is likely to dominate the system. The system resonance in this region varies approximately as $\sqrt{1/V}$ and the low frequency turnover point becomes unacceptably high. For example, an enclosure whose dimensions are 10 cm×5 cm×1 cm would produce a turnover frequency on the order of 600 Hz. Acoustical radiation below that frequency falls at a rate of 12 dB per octave for constant input. At 60 Hz, for example, the radiation is reduced by 40 dB with respect to that above 600 Hz.

Figures 1, 2, 3, 4, 5:
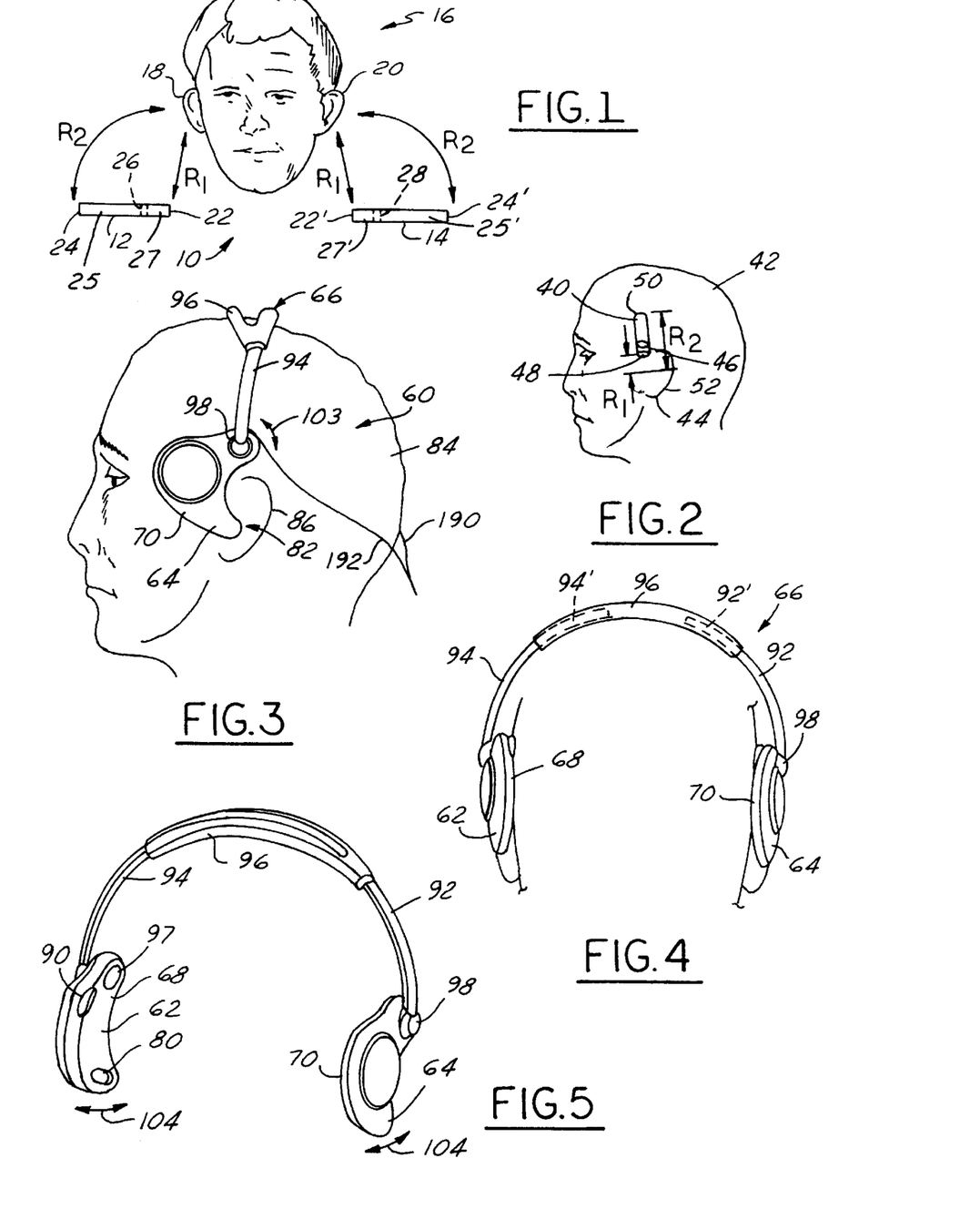
FIG. 1 schematically depicts a general system in accordance with the present invention.
FIG. 2 illustrates a more specific system in accordance with the present invention.
FIGS. 3–10 illustrate a preferred embodiment of the present invention, with FIG. 8 being an exploded view of an acoustic module and with FIGS. 9 and 10 being cross-sectional views taken along lines 9—9 and 10—10, in FIG. 6.
Figure 6:
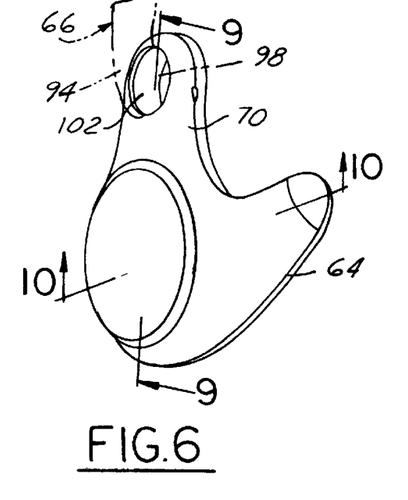
Figure 7:
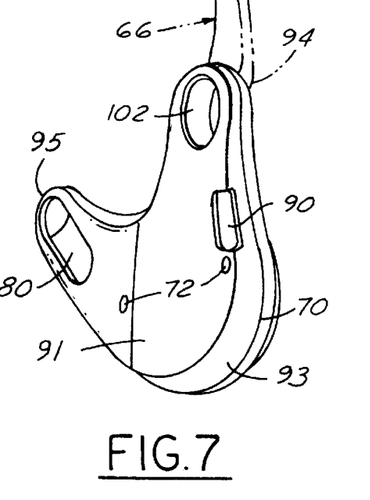
Figures 8, 9, 10:
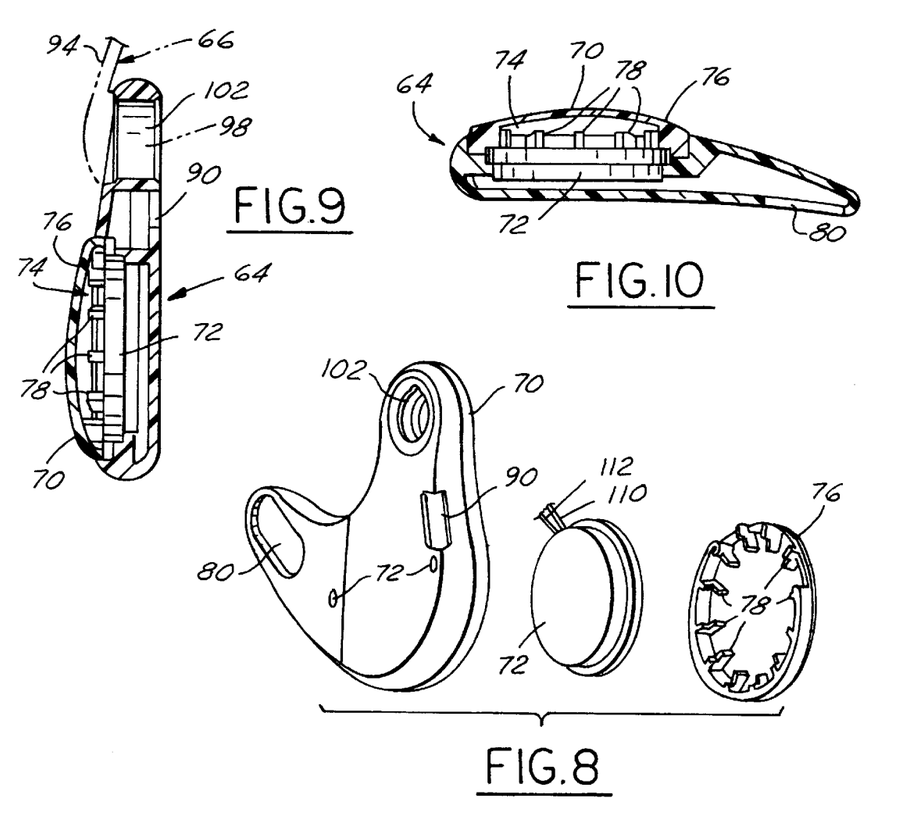

A system 10 in accordance with the present invention is shown in FIG. 1. A pair of enclosures or acoustic modules 12 and 14 are provided. The modules are positioned on opposite sides of the wearer's head 16, and each is situated in close proximity to one of the wearer's ears 18 and 20.

The enclosures or modules 12 and 14 are elongated as shown and have first audio openings (or outlet ports) 22 and 22' at one end (closest to the wearer's ears) and second acoustic openings (or vent ports) 24 and 24' at the other end.

One or more transducers (speakers) 26, 28 are positioned in each of the modules.

The transducers 26, 28 are situated in the modules between the two openings, and preferably sealed into a wall between a pair of chambers (ducts) 25, 27 and 25' and 27' which are vented as described. The ducts add acoustic mass, which lowers the resonant frequency of the system, extending the bass response.

The distance $R_1$ from the outlet ports 22, 22' to the closest ear and ear canal of the wearer is much less than the distance $R_2$ from the vent ports 24, 24' to that same ear. This results in a net amplitude at the wearer's ear which is comparable to that from the outlet ports 22 and 22' alone.

For best performance, the distance $R_2$ should be at least twice the distance $R_1$. Preferably, the ratio of distance $R_2$ to $R_1$ is in the range of 2:1 to 5:1 or higher, and more particularly in the range of 3:1 to 4:1. Preferably, the distance ratio $R_2$ to $R_1$ is made as large as possible for the system, based on practical limits set by a practical wearable configuration, and other acoustic effects, primarily resonances and mass loading due to the air columns.

FIG. 2 illustrates a more specific embodiment of the invention in which the acoustic module 40 is mounted or positioned on the wearer's head 42 immediately next to the ear 44. The modular housing has a transducer 46, an audio outlet port 48 and a vent port 50. Due to the configuration of the module 40, the distance $R_2$ from the vent port 50 to the ear canal 52 is several times greater than the distance from the outlet port 48 to the ear canal 52. Such a configuration allows the dipole speakers to provide improved low frequency (bass) audio signals.

The transducers shown in FIGS. 1 and 2 are mounted inside the modules, which are open at both ends. The transducers are preferably sealed into a wall which divides the module, tube or enclosure along its diameter or cross-section into two sections or portions, which can be of unequal length and different configurations.

The modules or enclosures 12 and 14 can be hollow, filled with an acoustically transparent material, or filled with a mildly absorbing material, especially absorbing at high frequencies. The filling material should not significantly load the transducer diaphragm due to acoustic back pressure. Preferably, an open-cell foam material is employed for this purpose. Whether or not the enclosure should remain empty or be filled, and the selection of the material in which to fill the enclosure, depends on a number of factors. The best choice for a given design may depend on the desired degree of stiffness required, the shape of the enclosure cavity, and additional factors such as the desire for high frequency damping to suppress undesired resonance within the enclosure. In this regard, it is easier to damp high frequencies than lower frequencies and this can be accomplished while at the same time maintaining good acoustic pressure coupling throughout the enclosure at low frequency.

The walls of the modules 12, 14 are preferably made from a substantially acoustically inert material, that is, non-radiative and absorbing, such as a plastic material. Also, the material forming the walls can be flexible and in some cases soft so that it will not irritate the wearer. The material also should be lightweight and inexpensive. Heavy gauge woven impregnated fabrics, most conventional plastic materials, and carbon fiber composites are materials which meet these objectives, but other comparable materials could be utilized. The walls and interiors of the modules are preferably designed to provide the best acoustical properties, and this could include a plurality of structural rib members, coated surfaces, or liners made from more acoustically efficient materials.

Tests have shown that "dipole" speakers in accordance with the present invention secure an audio enhancement at low frequencies. Compared with operation in sealed enclosures, the enhancement is on the order of 16–20 dB for frequencies on the order of 40–400 Hz.

Certain resonances may occur at higher frequencies because of the finite size of the enclosures. In these embodiments, the resonances can be overcome by splitting the input signal between low and high frequencies with a multi-speaker system. This comprises a "tweeter-woofer" arrangement. In other systems, the entire audio range may be covered with the same transducers. In those situations, it may be necessary to suppress the resonances to a point where they become inaudible. This can be accomplished by selection of an appropriate damping material to partially or completely fill the enclosure, by using shaped vents, or by using electrical equalization of the input signals.

The dipole configuration for wearable speakers also results in reduced radiation at long distances due to the out-of-phase character. This decreases the radiation beyond the wearer's immediate environment, especially at low frequencies which could be annoying to others, compared with in-phase systems.

Further details and description of the "dipole" principle and its benefits and advantages are found in commonly owned U.S. Pat. No. 5,617,477, the disclosure of which is hereby incorporated herein by reference.

As mentioned above, enhanced low frequency performance is achieved by using a single source in an open enclosure where the vent port or open end is placed as far as practicable from the ear. Of course, the two ends may be reversed if that results in a preferred wearable configuration. That is, the vent port may serve as the primary source. Typically, however, the open end source will yield less intensity at higher frequencies as a result of internal absorption. Therefore, an additional high frequency transducer ("tweeter") for each ear could also be utilized for such an embodiment.

Although only a single speaker or transducer is depicted in the drawings for use in the acoustic modules, it is also possible to provide two or more speakers in each module. For example, a group of three 16 mm diameter transducers could be used in place of a single 30 mm diameter transducer. The three transducers could be arranged in close proximity in an arc around the ear.

It is also to be understood that arrays of two or more closely coupled transducers could be substituted for a single transducer in order to obtain increased audio output. Mutual coupling between equiphased transducers in close proximity increases acoustic radiation efficiency, as is well-known.

In FIGS. 3–10, a preferred audio system 60 is shown. The system includes a pair of right and left acoustic modules 62 and 64, respectively, connected to a headband supporting member 66. The two acoustic modules have the same size and configuration, but are mirror images of one another.

The modules have housings or bodies 68, 70 which are made of a relatively lightweight, durable and rigid material, such as a molded plastic material. The housings 68, 70 are typically made of a pair of mating "halves" or portions which are snap fit and/or secured together in any conventional manner, such as by gluing, plastic welding, heat staking, and the like. It is also possible to secure the two body portions together by small screws 72 or other conventional fasteners.

The modules 62, 64 have a speaker or transducer 72 positioned in a cavity or pocket 74 inside the bodies 68, 70.

The speakers are held in place by cover members 76 which are glued, staked or otherwise conventionally secured to the housings. The cover members have one or more flanges 78 which are adopted to position and hold the speaker securely in place in the housing. Appropriate gaskets, sealing members or other means (not shown) could be used to seal the edge around the cover members and the joints between the housing portions where desired.

The modules 62, 64 each have an audio opening (or outlet port) 80 which, as depicted in FIGS. 3–5, is positioned adjacent to, but not touching or covering, the ear and ear canal 82 of the wearer 84. The outlet port 80 conveys the audio signals from the speaker 72 to the wearer's ear 86. If desired, the outlet port can consist of more than one opening.

The modules 62, 64 also have acoustical openings (or vent ports) 90 which are positioned on the modules substantially on the opposite sides of the transducers 72 from the outlet ports 80. The positioning and effect of the vent ports is explained in detail in co-owned U.S. Pat. No. 5,617,477. In general, the sizes and configurations of the housings in combination with the placement of the outlet and vent ports combine to provide improved full high-fidelity audio output to the wearer, particularly in the low frequency ranges. Also, if desired, the vent port can consist of more than one opening.

The headband member 66 has a pair of module connecting members 92 and 94 connected to a support member 96. The support member 96 preferably has a wider profile to provide a firm and secure platform to hold and support the system 60 on the wearer's head. The connecting members 92 and 94 preferably are adjustable in order to allow the system 60 to adjust to fit different wearers and to allow the wearer to position the modules as desired adjacent his or her ears. The connecting members can be adjustable, for example, by telescoping sliding connections 92' and 94' as shown in FIG. 4. Other conventional mechanisms for adjusting the modules relative to the ears and support members could also be utilized. In addition, one or more support members could be positioned around the back of the head of the wearer for added stability, if desired. Such members may be suitable for some applications such as active sports and exercise.

The modules 62, 64 are also rotatably attached to the connecting members 92 and 94 by pivot mechanisms. The connecting members have circular members 97 and 98 on their ends which are rotatably mounted in circular openings 100 and 102, respectively. The modules can rotate relative to the headband in the manner shown by arrow 103 in FIG. 3. The ability to rotate the modules relative to the headband allows the user to adjust and position the outlet openings precisely where desired relative to his or her ears and ear canals. Moreover, in the same or similar manner, the modules 62, 64 could be adapted to be rotated toward and away from the wearer's head—as indicated by arrows 104 in FIG. 5. Rotating and pivoting mechanisms for accomplishing this are within the skill of persons in the art and any conventional mechanisms or systems could be utilized.

The precise positioning of the vent ports 90 is dependent on a number of factors, such as the position of the wearer's head, the performance of the system, ease of manufacture, and the like. In the embodiment shown, the vent ports 90 are situated in the corner of the housing 70 between the back wall 91 and an outer or side wall 93 (see FIG. 7). The vent port could also be positioned at other locations in the back wall or side wall. Similarly, the outlet port 80 could be positioned in other locations on the module, such as the end 95 of the side wall, etc., and can consist of more than one opening. The vent ports further could be incorporated into an extended duct which is, in turn, incorporated into the head band supporting member 66, which in this event would be hollow and generally larger in diameter than the embodiment shown in FIGS. 3–10.

The vent and outlet ports could be covered by decorative or structural members or materials if desired, so long as the acoustic transmission is high over the entire audio band. For example, cloth or fabric coverings could be used to cover the ports, or metal or plastic covers with mesh-type structures or perforations could be utilized (as explained in more detail below).

The speaker/transducer 72 has a pair of wires 110, 112 attached to it in order to electrically connect the transducer or transducers to the source of audio signals. As indicated herein, the audio system 60 could be a wired or wireless system, with the electrical components (such as batteries, antennas, circuitry, etc.) being positioned in the headband or at another location, either on or adjacent to the wearer's body.

The connections between the transducers and their power and driving sources may be accomplished by the use of wires or other conventional electrical connection devices. It is also possible to use wireless technology, such as radio frequency, infrared or inductive coupling in order to distribute the signals from audio sources to the transducer drive electronics.

If included in the system, the electronic circuitry and batteries for the system can be positioned in the acoustic modules or in other portions of the wearable garment or headgear, or on other portions of the wearer's body. In this regard, complete radio, portable telephone, or cellular telephone systems (with microphones) could be integrated into the systems 10 and 60.

Figure 11:
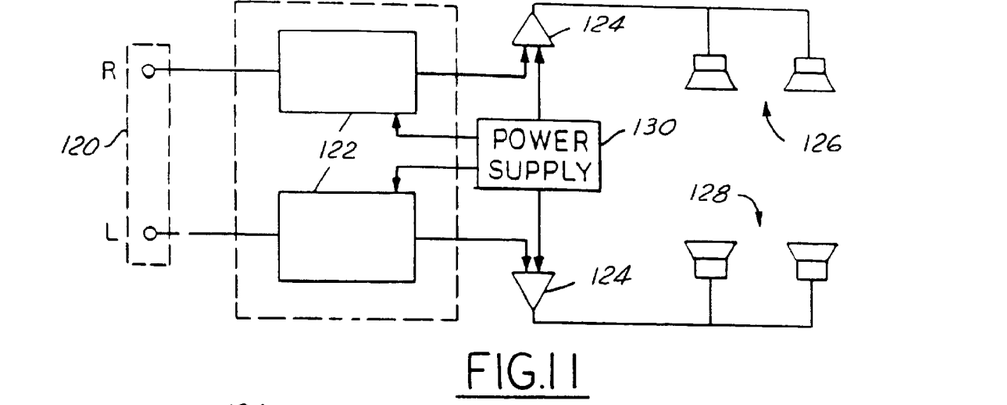
FIG. 11 schematically illustrates one electronic system which can be used with the present invention.

FIG. 11 is a schematic diagram of a basic system which could be utilized in accordance with the present invention and in which the electronics and other circuitry, if included, are mounted in a module or headband. In FIG. 11, the right "R" and left "L" audio signals are introduced into the system at 120. The signals are then passed through equalization filters and preamplifiers 122 and driven by driver amplifiers 124. The resultant signals are sent to the transducers, such as arrays 126 and 128. Power supply 130 supplies the power for the filters, preamps and driver amps.

Figure 12:
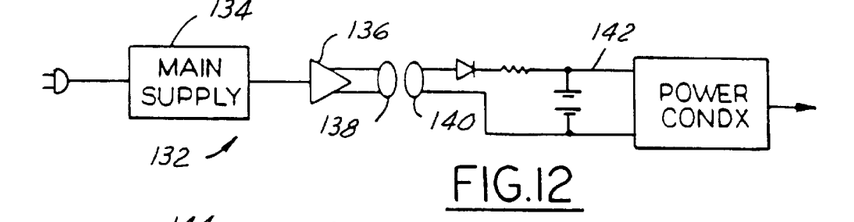
FIG. 12 illustrates an alternate power supply for the present invention.

The power supply 130 can be any one of a variety of conventional types of power supplies conventionally used for portable electronic products today. For example, the power supply could be one or more long life batteries. The power supply also could be a rechargeable battery which uses an inductive charging system 132, such as that shown in FIG. 12. In FIG. 12, the main power supply 134 is passed through a high frequency oscillator 136 and used to establish a charging frequency in coil 138. Receiving coil 140 in the headband or other wearable embodiment charges the battery 142 which in turn supplies power for the system.

Figures 13, 14:
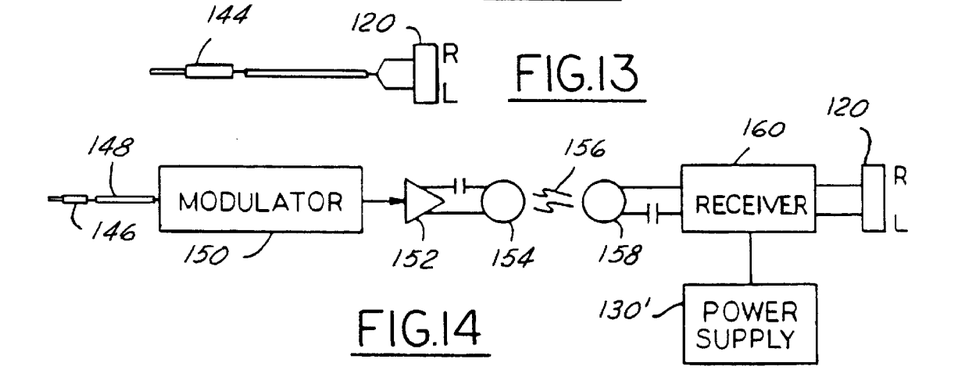
FIGS. 13 and 14 illustrate alternate embodiments for inputting an audio signal into the system.

The audio input into the system 120 can be received from a variety of different systems, two of which are shown in FIGS. 13 and 14. In FIG. 13 the source of the audio input is from a jack member 144 which is hard wired directly to the system 120. The jack member can be connected to an FM radio, a cassette tape player, a cellular telephone, a computer (desktop or portable), a CD player, or any similar device. As indicated above, the device is preferably portable so it can be easily transported or carried by the wearer.

FIG. 14 illustrates a wireless link version of the present invention, where the audio input is secured by inductive coupling. A jack member 146 is plugged into a conventional electronic audio source (such as an AM or FM radio, cassette tape player, CD player, digital audio tape player (DAT), a minidisc player, a digital cassette player (DDC), a portable telephone, a solid-state audio player, a computer, a personal information device, a cellular telephone, a portable television, a head-mounted display system etc., or any other conventional communication system) and receives a stereo audio signal 148. The electronic source can be worn at a distance from the head of the wearer, such as at the waist of the wearer, in a pocket, briefcase, purse, backpack, etc. The signal 148 is applied to a stereo FM modulator 150, which drives a radio frequency (RF) source 152 which in turn drives the primary 154 of a loosely coupled radio frequency transformer. The induced signal 156 is received by receiver coupling loop 158 and stereo FM receiver 160, which can be a single integrated circuit (IC). The receiver 160 is driven by power supply 130' which can be any conventional source, as discussed above with reference to power supply 130 (FIG. 11). The carrier for the receiver can be, for example, a 2–30 MHz carrier. Other methods of transferring signals across or to the body can be utilized, for example infrared and radio frequency systems such as those used in commercially available wireless headphones.

Another inductive system (not shown) can use two independent (different frequency) signals, one for the right module and one for the left module, each with an independent transmitter (primary) and receiver (secondary) circuit. This system utilizes more components, but it allows for complete separation of functions for the two ears, without connecting wires between the two modules. It is also possible to use a conventional sub-carrier FM system, such as in a commercial FM broadcast, or a monaural system which can produce higher signal-to-noise ratios than a sub-carrier system.

The audio system using the dipole transducer configuration of the present invention, could be controlled in any conventional manner. For example, controls could be mounted directly on the modules, or positioned at another location or on another device on the wearer connected by wires. One preferred position for placement of the control system is at the wrist of a wearer, either in the cuff of a garment or on a separate wristband, perhaps combined with status, timekeeping, (e.g. watch) or other display functions. The control device could also communicate via radio frequencies or other signal means which do not require wired communications.

A wireless embodiment could use a transmitter integrated into a belt clip for a mini-disc, or other type, player. A set of contacts could be added to the back of the player in order to allow parasitic extraction of both power and the audio signal.

In an alternate embodiment, transducers which are selected for optimum low frequency response can be combined with transducers which are better for higher frequencies. This provides improved over-all high fidelity performance. A cross-over network used to divide audio signals into appropriate bands for this purpose is shown in FIG. 15.

Figure 15:
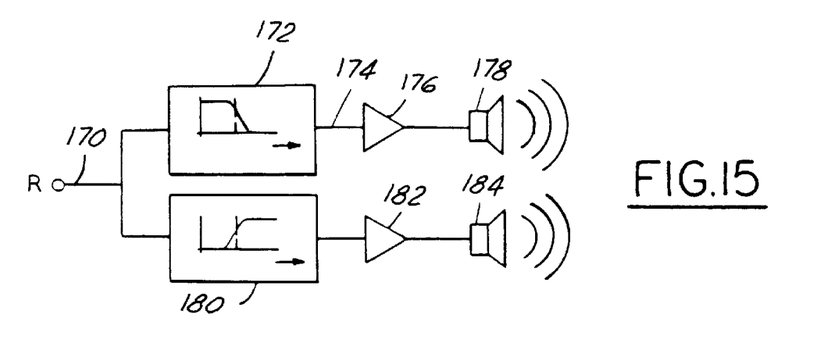
FIG. 15 illustrates a cross-over network for use with the present invention.

In FIG. 15 only the right channel "R" circuit diagram is shown, but it is understood that the circuit diagram for the left channel is identical. The audio signal 170 is fed into low pass filter 172 and the resultant signal 174 is amplified by amplifier 176 and used to drive the right "woofer" speaker 178. At the same time, the signal 170 is passed through high pass filter 180, amplified by amplifier 182 and used to drive the right "tweeter" speaker 184. The filters 172 and 180 can have either an analog or digital implementation.

The transducers 72 in the modules 62, 64 are positioned in the audio system 60 so that they will be positioned immediately above, behind, below, or adjacent to the ears of the wearer when the system is worn. Preferably, the speakers or transducers are positioned above or just forward of the entrances to the ear canals of the wearer. The speaker enclosure structure, with or without a foam core, offers a satisfactory combination of good acoustical parameters, lightweight and conformable characteristics.

The configuration of transducer(s) and the enclosures and their support means is preferably arranged to minimize or eliminate contact with the ears for maximum long term comfort. Further, by suitably arranging head contact pads, the module supports can straddle the temples of glasses so as to not to put any additional loading on the ears of the wearer. Conventional headphones are generally unable to satisfy this comfort goal.

Physical contact between the walls of the module housings, or the contact pads, and the wearer's temples also is beneficial. It promotes direct coupling of low audio frequencies to the wearer's head, thus producing an important pleasant subjective effect giving the impression of further extended low frequency response.

Wires required to connect the transducers to the audio source are preferably arranged to emerge from the system or modules at a convenient place, preferably just above or behind the ears. In FIG. 3, the wires are identified by the numerals 190 and 192.

For a wireless system, the electronics can be encapsulated in the hollow portion of the support member 96, or in an enclosure integrated into the headband either in the region of 96, or alongside the head in an enlarged supporting member 92,94. The electronic components include the receiver(s), power amplifier(s) and optional digital electronics for system control (automatic power on/off, automatic diversity receive, low battery detect and audio warning, etc.) Additional features such as equalization, spatialization and DSP can be included. The transmitter (primary) could also be integrated into the audio source, or it could be a "parasite" attachment, e.g., integrated into a belt clip for the audio source.

Power can be supplied to the system by one or more replaceable batteries. The power can also be supplied by a permanent battery which is charged with a inductive coupler to an external charging supply, as is well-known, or by direct connection to a charging source.

In order to provide even better bass response at frequencies of typically 40–100 Hz, it may be desirable to use bass boost or equalization in the system. This drives more electrical power into the speakers or transducers below their effective resonance. Typically, an additional 12 dB boost of power can be used for each octave below resonance. This is known for high-end audio speaker systems.

It also is possible to use multiple transducers in each of the modules adjacent each of the ears of the wearer, as discussed above. This would increase the bass response limits. The power handling improves proportionally to the number of transducers provided. It may also be advantageous to use multiple small transducers rather than a single large transducer in order to optimize the shape and weight distribution for maximum comfort, stability and fashion. Also, the mutual acoustic coupling at low frequencies enhances the effective radiation resistance and therefore the output beyond simple additive response.

The speakers 72 in the two modules 62 and 64 are driven in phase. The speakers are driven by any conventional amplifier and a conventional equalizer which can be either analog or DSP-based and adjusted to provide a tapered 12 db of bass boost below 160 Hz. The speakers also can be driven directly from a conventional commercial audio source. This yields satisfactory results which are competitive with high quality headphones. In fact, in some cases, the "sound stage spatialization" sensation resulting from the separation of the sound source from the ears can be superior to that produced by standard headphones. The pleasant effect of apparent additional low frequency extension due to direct coupling into the temples can also be noted.

Figures 16, 17:
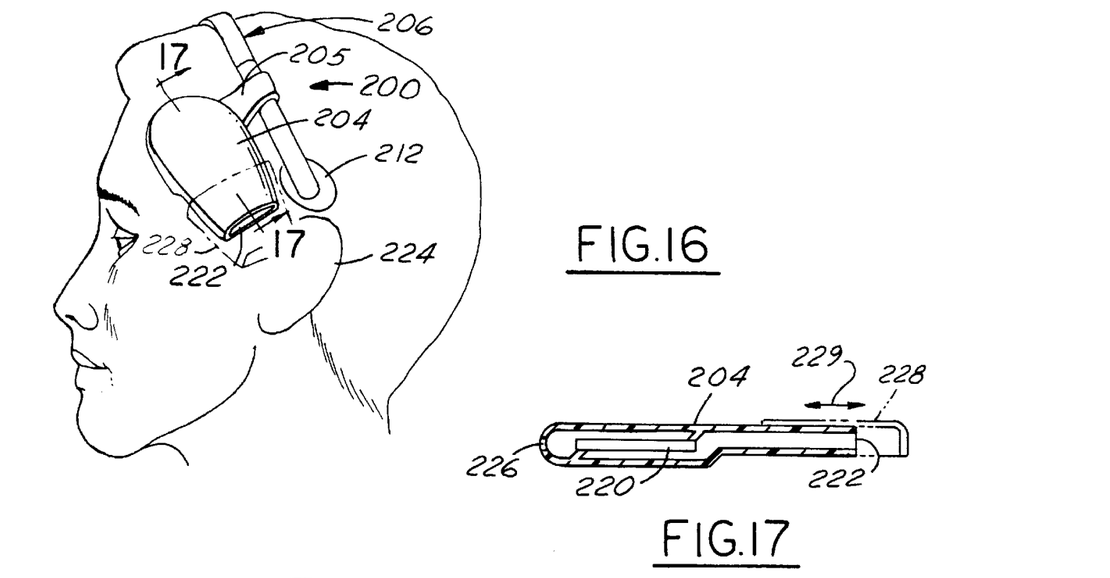
FIGS. 16–19 illustrate another embodiment of the invention.
Figure 18:
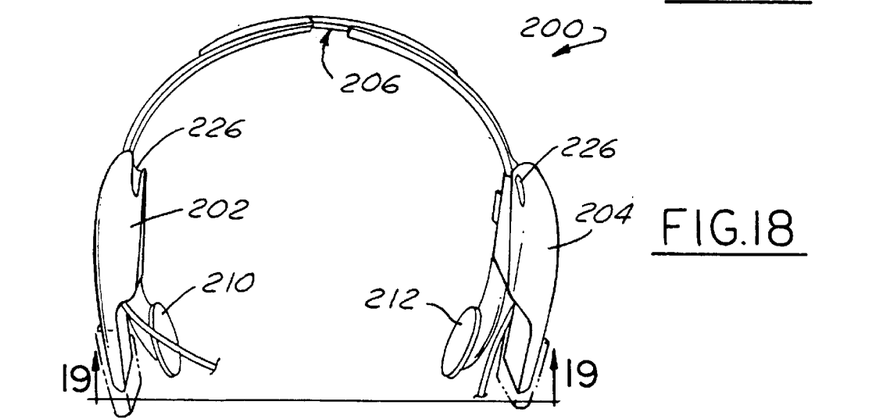
Figure 19:
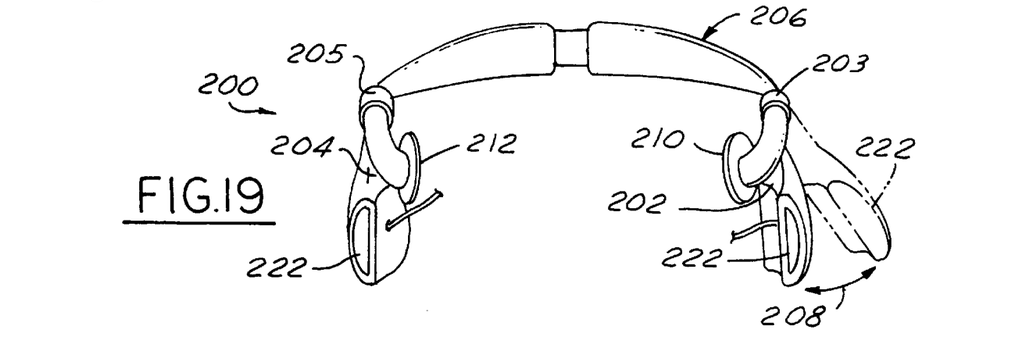

Another embodiment of the invention is shown in FIGS. 16–19, with FIG. 17 being a cross-sectional view of the acoustic module in FIG. 16. The audio system 200 includes a pair of acoustic modules 202 and 204 connected to a headband supporting member 206. In this embodiment, the modules are rotatably connected to the headband by support arms 203 and 205. In this manner, the modules can be adjusted and positioned in the manner shown by arrow 208 in FIG. 19.

The headband 206 has a pair of temple supports 210 and 212 which are adopted to be positioned against the wearer's head 214 in the manner shown in FIG. 16 and provide additional support for the system 200. Soft or foam pads are preferably provided on the temple supports for comfort.

The modules 202 and 204 preferably comprise plastic housings provided in the sizes and configurations shown in FIGS. 16–19. A transducer or speaker 220 is mounted inside each of the modules, preferably on a wall which separates the modules into two chambers. Also each of the modules have an audio opening (or outlet port) 222 which is adopted to be positioned, as shown, adjacent to the wearer's ears 224. The modules 202 and 204 also have an acoustical opening (or vent port) 226 which is located as far as practical in the housing away from the wearer's ears and ear canals.

The functioning and performance of the audio system 200 is the same as the system 60 described above. Also, the electrical and audio components are the same and can be provided and utilized in the same manner.

The configuration exemplified in FIGS. 16–19 has the advantage of providing complete freedom of access to the wearer's ears, an advantage for some applications such as the simultaneous use of a telephone. This is accomplished at the expense of higher audio power drive and greater radiation of sound into the environment compared with the embodiment of the invention shown in FIGS. 3–10.

In order to assist in directing the audio signal more directly toward the ear canals of the wearer, a deflector or diverter 228 can be added at the outlet end of the modules. The diverter 228 deflects the sound to the wearer's ears, as shown by arrow 227 in FIG. 17. Moreover, the diverter 228 can be movable or adjustable to suit the needs and listening enjoyment of the wearer, as shown by arrow 229 in FIG. 17.

Figures 20, 21, 22:
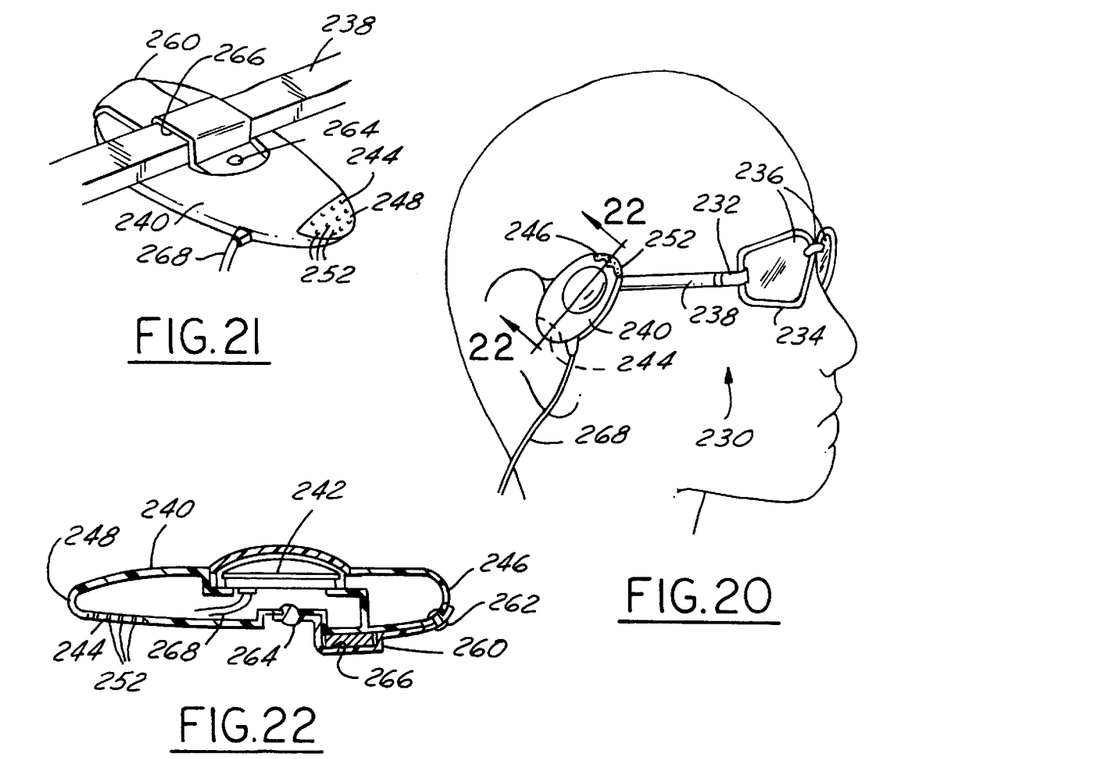

FIGS. 20–22 depict an embodiment 230 of the invention which is adapted to be fastened to a pair of eyeglasses 232, or any active personal display device. The eyeglasses can be any type of conventional or special eyeglasses, such as prescription eyeglasses, sunglasses, eyeglasses acquired specifically for use with the invention, etc. The eyeglasses generally have a frame member 234 in which a pair of lenses 236 are positioned, and a pair of temple members (or earpiece members) 238 (only one of which is shown).

In the embodiment 230, a pair of separate acoustic modules 240 preferably are provided, one for each ear of the wearer and thus for attachment to each of the temple members 238. Although only one acoustic module 240 is shown in the drawings, it is to be understood that the other acoustic module (for the other temple member) not depicted is the same as the one illustrated (and a mirror image thereof) and operates in the same manner.

The acoustic module 240 is similar to the acoustic modules 62 and 64 discussed above in construction, materials, operation and performance. Thus, for details, FIGS. 8–10 and the description pertaining thereto should be referenced and are hereby incorporated by reference. In general, the module comprises a housing made from a plastic material and having a transducer 242, an audio opening (outlet port) 244 generally at one end, and an acoustic opening (vent port) 246 generally at the other end. In this embodiment, the two openings 244 and 246 are covered by pieces of metal or plastic material 248 and 250, each with a plurality of small openings 252. Of course, it is understood that the openings 244 and 246 could be left uncovered, or that other materials and coverings (such as fabric, mesh, etc.) could be utilized.

The acoustic modules 240 are fastened to the eyeglasses with a clip-on fastening member or device 260 which, in the embodiment shown, is a piece of metal or plastic material which is connected to the module housing. The member 260 is affixed to the housing at one end with a rivet or other fastener 262 and preferably releasably secured to the housing at the other end with a snap-type or other conventional releasable fastener 264. Other releasable and nonreleasable clips and fastener devices and mechanisms known to persons skilled in the art could also be used. If a permanent or nonreleasable clip or fastener is utilized, the temple members 238 could be longitudinally slid through the openings 266 and the acoustic module positioned in the manner shown in the drawings. It is also possible to provide a pivotable member together with, or in place of, the clip/fastening member so that the module and its audio and acoustic openings could be positioned as desired by the wearer for optimum performance and wearable comfort.

The acoustic modules could be part of a wired or wireless system and could utilize any conventional electronic system, such as those described above, and utilized with the other embodiments of the invention. In the embodiment 230 shown in FIGS. 20–22, the modules are connected to the electronic system (not shown) by wires 268.

Figure 23:
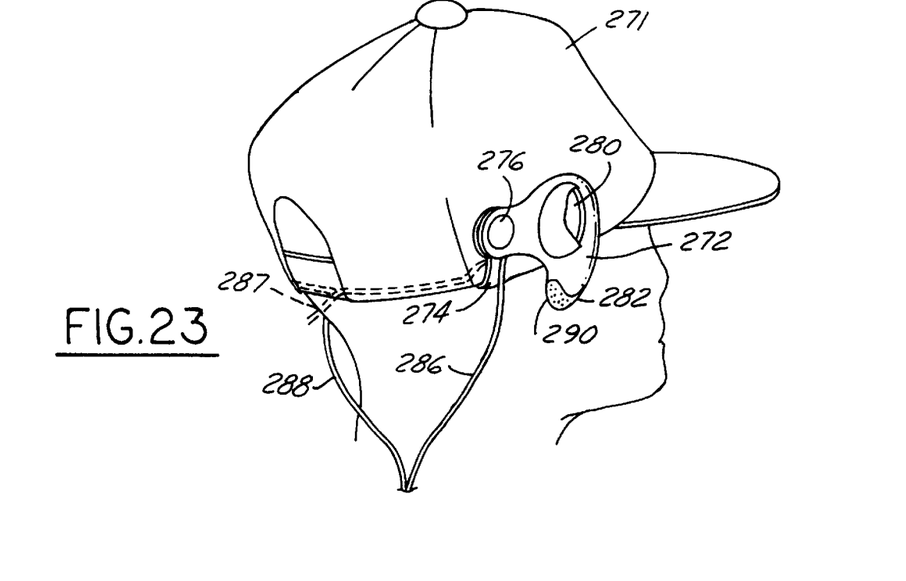
FIGS. 23–26 depict wired and wireless embodiments of the present invention which are adapted to be clipped on or fastened to a hat or cap.
Figures 24, 25, 26:
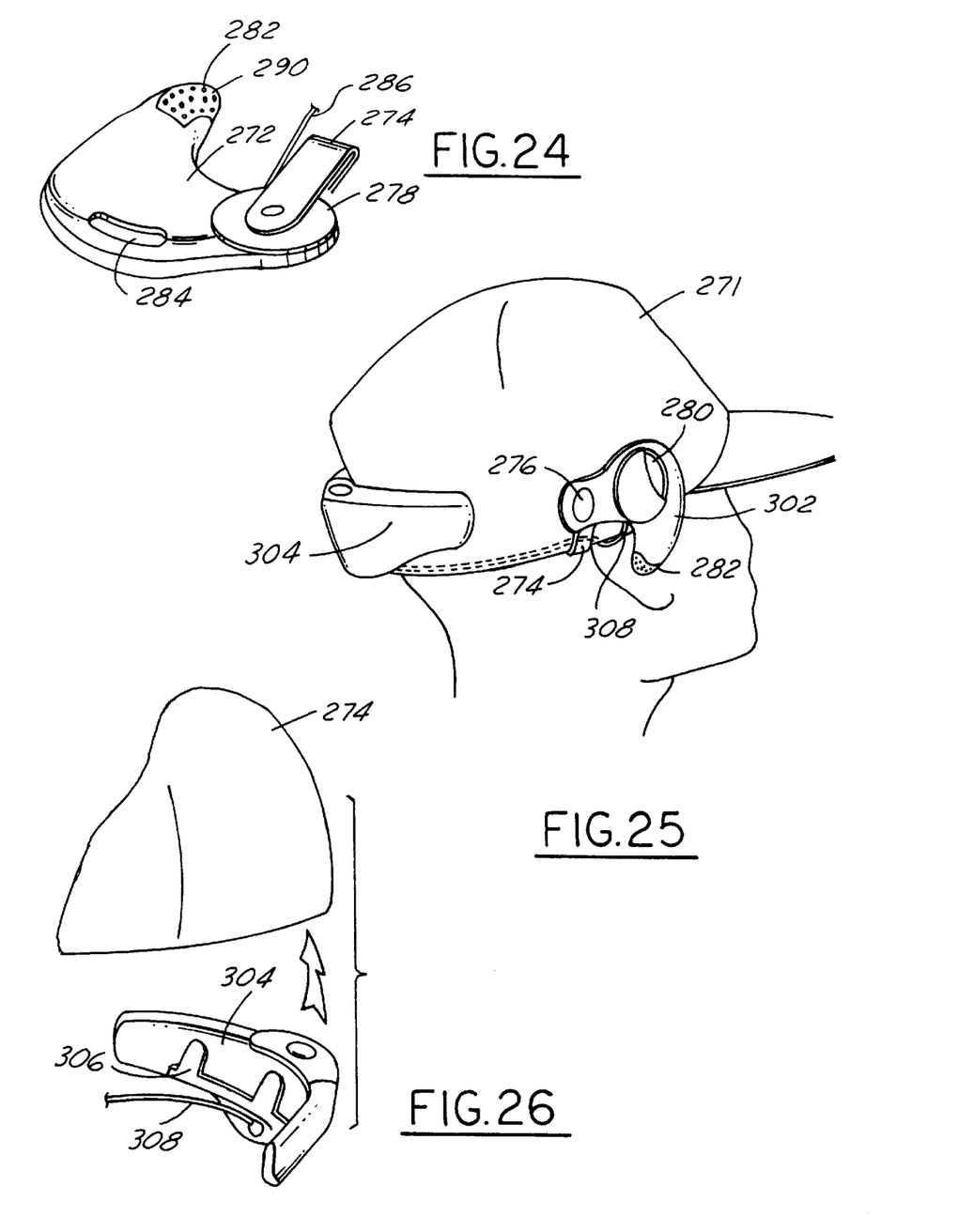

Clip-on embodiments of the invention for use with a baseball-style hat or cap are shown in FIGS. 23–26. Audio system 270 in FIGS. 23–24 is a wired system, while audio system 300 in FIGS. 25–26 is a wireless system.

In the wired system 270, a pair of acoustic modules 272 (right and left), only one of which is shown, are attached by clips/fastener members 274 to a cap 271. The members 274 are U-shaped spring clip members made from a metal or plastic material and connected at one end to the module 272 by a rotatable or pivotable fastener member 276. The other end of the clip member has a pad member 278.

Each of the acoustic modules 272 has a transducer or speaker 280, an audio opening (outlet port) 282 and an acoustic opening (vent port) 284, and operates in the same manner as the other systems discussed above. Wires 286 and 288 connect the modules 272 to an audio electronic system. Alternatively, a single wire 287 could be provided which connects with separate wires to the modules which emerge from the pivot regions. A perforated metal or other material screen member 290 is optionally used to cover the outlet port.

The acoustic modules 272 can be utilized with any type of cap, hat or other similar head gear, and can be fastened or otherwise secured in any conventional manner within the skill of persons in the art. For example, the modules could be secured by Velcro-type fasteners, elastic bands, two-part pins, or other types of conventional fasteners or clips.

In the wireless clip-on system 300 shown in FIGS. 25 and 26, the acoustic modules 302 are the same as modules 272 and are attached to the hat or cap 271 in the same manner, preferably with clip-type fasteners 274. The electronic module 304, which contains the requisite antennas, circuitry, batteries, transmitter(s), receiver(s), and other electronics, is also clipped on or secured to the hat 271 in a similar manner, such as by clip 306.

In the embodiment shown, the acoustic modules 302 are electronically connected to the electronics module 304 by wires 308. The wires can be positioned in the lining of the hat and hidden from view.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

It is claimed:

1. An audio system for wearing on the head of a wearer, said system comprising:
    a headband member;
    a first acoustic module attached to said headband, said first acoustic module having a first transducer, a first acoustic outlet opening and a first acoustic vent opening;
    a second acoustic module attached to said headband, said secured acoustic module having a second transducer, a second acoustic outlet opening and a second acoustic vent opening; and
    means for supplying audio signals to said first and second transducers;
    whereby when said system is worn on the head of a wearer with the first acoustic module being positioned adjacent, but not blocking or covering one of the wearer's ears, the second acoustic module being positioned adjacent, but not blocking or covering the other of the wearer's ears, the first and second acoustic outlet openings being positioned adjacent the ear canals of the wearer's ears, and the first and second acoustic vent openings being positioned at a distance further from the wearer's ears than the respective first and second transducers, the system provides a low frequency response which approximates that provided by conventional headphones and earphones that cover the wearer's' ears and significantly block external sounds to the ears.

2. The audio system of claim 1 wherein said system is wireless and the electronics system for activating said first and second transducers is positioned in said headband member.

3. The audio system of claim 1 wherein said first and second acoustic modules are rotatably attached to said headband member.

4. The audio system of claim 1 further comprising first and second perforated members covering said first and second acoustic outlet openings.

5. The audio system of claim 4 further comprising third and forth perforated members covering said first and second acoustic vent openings.

6. The audio system of claim 1 wherein said first and second acoustic modules are each filled with a material which is at least partially acoustically transparent.

7. The audio system of claim 1 wherein each of said first and second acoustic modules comprise at least two transducers.

8. The audio system of claim 1 wherein said means for supplying audio signals is selected from the group comprising a CD player, radio, digital audio tape player, solid-state audio player, computer, personal information device, mini-disc player, telephone, television and cassette tape player.

9. The audio system of claim 1 wherein said first acoustic module comprises first and second chambers and said first transducer is mounted on a first wall separating said first and second chambers, and said second acoustic module comprises third and fourth chambers and said second transducer is mounted on a second wall separating said third and fourth chambers.

10. The audio system of claim 9 wherein said first and second chambers add acoustic mass to said first acoustic module wherein the resonant frequency of said first acoustic module is lowered and the bass response is extended, and wherein said third and fourth chambers add acoustic mass to said second acoustic module wherein the resonant frequency of said second acoustic module is lowered and the bass response is extended.

11. The audio system of claim 2 wherein said wireless system is an inductive wireless system.

12. The audio system of claim 1 wherein said means for supplying audio signals includes a control device for controlling the frequency and amplitude of said audio signals.

13. The audio system of claim 12 wherein said control device is wireless.

14. The audio system of claim 12 wherein said control device is adapted to be worn on the wrist of the wearer.

15. The audio system of claim 1 further comprising at least one contact pad mounted on each of said first and second acoustic modules.

16. The audio system of claim 1 further comprising an electronic system positioned in said headband member.

17. An audio system for wearing with a pair of eyeglasses on the head of a wearer, said eyeglasses having a front frame member and first and second earpiece members, said system comprising:
    a first acoustic module having a first transducer, a first outet port and a first vent port, said first outlet port and said first vent port being positioned substantially on opposite sides of said first transducer;
    a first fastener member for attaching said first acoustic module to said first earpiece member;
    a second acoustic module having a second transducer, a second outlet port and a second vent port, said second outlet port and said second vent port being positioned substantially on opposite sides of said second transducer;
    a second fastener member for attaching said second acoustic module to said second earpiece member; and
    means for supplying audio signals to said first and second transducers;
    whereby when said system is worn on the head of a wearer with the first acoustic module being positioned adjacent, but not blocking or covering one of the wearer's ears, the second acoustic module being positioned adjacent, but not blocking or covering the other of the wearer's ears, the first and second outlet ports being positioned adjacent the ear canals of the wearer's ears, and the first and second vent ports being positioned at a distance further from the wearer's ears than the respective first and second transducers, the system provides a low frequency response which approximates that provided by conventional headphones and earphones that cover the wearer's' ears and significantly block external sounds to the ears.

18. The audio system of claim 17 wherein said first and second fastener members are rotatably attached to said first and second acoustic modules, respectively, whereby the positioning of the first and second outlet ports can be adjusted relative to the ears of the wearer.

19. The audio system of claim 17 further comprising first and second perforated members covering said first and second outlet ports.

20. The audio system of claim 19 further comprising third and forth perforated members covering said first and second vent ports.

21. The audio system of claim 17 wherein said first and second acoustic modules are each filled with a material which is at least partially acoustically transparent.

22. The audio system of claim 17 wherein said means for supplying audio signals is selected from the group comprising a CD player, radio, digital audio tape player, solid-state audio player, computer, personal information device, mini-disc player, telephone, television and cassette tape player.

23. The audio system of claim 17 wherein said system is wireless and the electronics system for activating said first and second transducers is positioned in said first and second acoustic modules.

24. The audio system of claim 17 wherein said first and second acoustic modules each comprises at least two transducers.

25. An audio system for wearing on the head of a wearer in combination with a hat or cap, said audio system comprising:
   a first acoustic module having a first transducer, a first outlet port and a first vent port, said first outlet port and said first vent port being positioned substantially on opposite sides of said first transducer;
   a first fastener member for attaching said first acoustic module to said hat or cap;
   a second acoustic module having a second transducer, a second outlet port and a second vent port, said second outlet port and said second vent port being positioned substantially on opposite sides of said second transducer;
   a second fastener member for attaching said second acoustic module to said hat or cap; and
   means for supplying audio signals to said first and second transducers;
   whereby when said system is worn on the head of a wearer with the first acoustic module being positioned adjacent, but not blocking or covering one of the wearer's ears, the second acoustic module being positioned adjacent, but not blocking or covering the other of the wearer's ears, the first and second outlet ports being positioned adjacent the ear canals of the wearer's ears, and the first and second vent ports being positioned at a distance further from the wearer's ears than the respective first and second transducers, the system provides a low frequency response which approximates that provided by conventional headphones and earphones that cover the wearer's' ears and significantly block external sounds to the ears.

26. The audio system of claim 25 further comprising an electronics module and a third fastener member, said third fastener member for attaching said electronics module to said hat or cap.

27. The audio system of claim 25 wherein said first and second fastener members are rotatably attached to said first and second acoustic modules, respectively, whereby the positioning of the first and second outlet ports can be adjusted relative to the ears of the wearer.

28. The audio system of claim 25 further comprising first and second perforated members covering said first and second outlet ports.

29. The audio system of claim 28 further comprising third and forth perforated members covering said first and second vent ports.

30. The audio system of claim 25 wherein said first and second acoustic modules are each filled with a material which is at least partially acoustically transparent.

31. The audio system of claim 25 wherein said means for supplying audio signals is selected from the group comprising a CD player, radio, digital audio tape player, solid-state audio player, computer, personal information device, mini-disc player, telephone, television and cassette tape player.

32. The audio system of claim 25 wherein said first acoustic member is rotatably attached to said first fastener member and said second acoustic member is rotatably attached to said second fastener member.

33. The audio system of claim 25 wherein said first and second fastener members each comprise a spring clip member.

34. The audio system of claim 25 wherein said first and second acoustic modules are each attached by wires to said electronics module.

35. The audio system of claim 25 wherein said system is wireless.

36. The audio system of claim 25 wherein said first and second acoustic modules each comprise at least two transducers.

37. The audio system of claim 25 wherein said means for supplying audio signals to said first and second transducers comprises a control device which is adapted to be positioned at a distance from the head of the wearer.

38. The audio system of claim 25 wherein said first acoustic module comprises first and second chambers and said first transducer is mounted on a first wall separating said first and second chambers, and said second acoustic module comprises third and fourth chambers and said second transducer is mounted on a second wall separating said third and fourth chambers.

39. The audio system of claim 38 wherein said first and second chambers add acoustic mass to said first acoustic module wherein the resonant frequency of said first acoustic module is lowered and the bass response is extended, and wherein said third and fourth chambers add acoustic mass to said second acoustic module wherein the resonant frequency of said second acoustic module is lowered and the bass response is extended.

40. The audio system of claim 25 wherein said wireless system is an inductive wireless system.

41. The audio system of claim 25 wherein said means for supplying audio signals includes a control device for controlling the frequency and amplitude of said audio signals.

42. The audio system of claim 41 wherein said control device is wireless.

43. The audio system of claim 41 wherein said control device is adapted to be worn on the wrist of the wearer.

44. The audio system of claim 25 further comprising at least one contact pad mounted on each of said first and second acoustic modules.

* * * * *

UNITED STATES PATENT AND TRADEMARK OFFICE
CERTIFICATE OF CORRECTION

| | | |
|---|---|---|
| PATENT NO. | : 6,301,367 B1 | Page 1 of 1 |
| APPLICATION NO. | : 09/096114 | |
| DATED | : October 9, 2001 | |
| INVENTOR(S) | : Boyden et al. | |

It is certified that error appears in the above-identified patent and that said Letters Patent is hereby corrected as shown below:

On the Title page, in field (63), in column 1, under "Related U.S. Application Data", line 1, delete "08/877,793" and insert -- 08/887,793 --, therefor.

In column 1, line 2, delete "08/877,793" and insert -- 08/887,793 --, therefor.

Signed and Sealed this

Eighteenth Day of May, 2010

David J. Kappos
*Director of the United States Patent and Trademark Office*